March 8, 1932. W. TIMSON 1,848,587
READING ARRANGEMENT OF WEIGHING APPARATUS
Filed Dec. 24, 1929
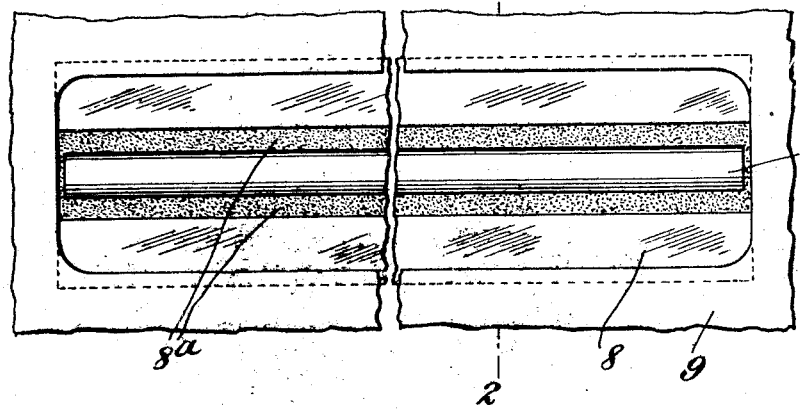
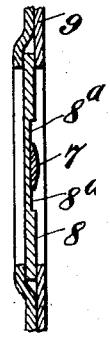
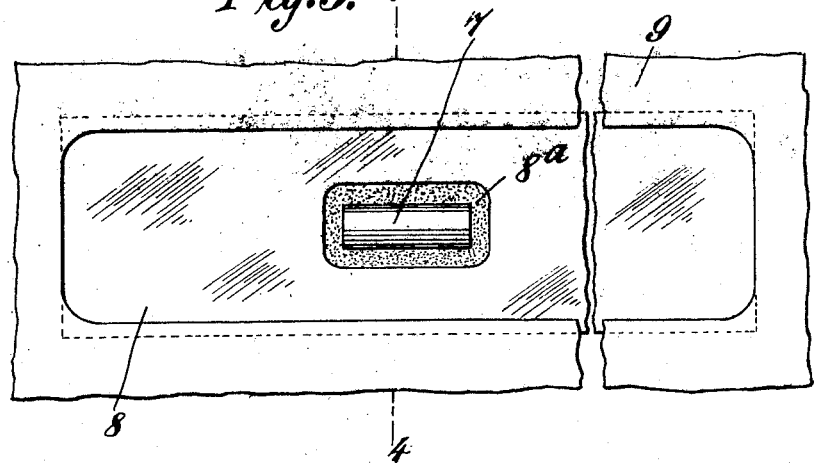
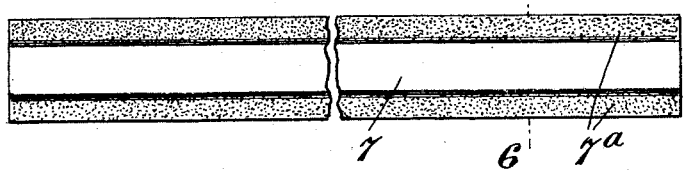
Inventor:—William Timson
By:— George E. Folkes.
Attorney.

Patented Mar. 8, 1932

1,848,587

UNITED STATES PATENT OFFICE

WILLIAM TIMSON, OF BIRMINGHAM, ENGLAND, ASSIGNOR TO W. & T. AVERY LIMITED, OF SOHO FOUNDRY, BIRMINGHAM, ENGLAND

READING ARRANGEMENT OF WEIGHING APPARATUS

Application filed December 24, 1929, Serial No. 416,244, and in Great Britain February 1, 1929.

This invention has reference to improvements in and relating to the reading arrangements of weighing apparatus and is concerned more particularly for use in connection with the indicators of weighing apparatus including therewith price computing arrangements, and has for its object to ensure a definite zone for the weighman or other reader of the index which will afford a determined and clear reading, and which avoids the possibilities of parallax.

The invention consists of improvements in or connected with anti-parallax lens devices, more particularly for use in connection with the indicators of weighing and/or price computing apparatus, characterized by the observation window having part of its area formed as or associated with a lens whereby the observation or reading area is defined within given limits determined by said lens, and any attempt to read outside the area of the lens is optically obstructed.

This invention may be carried into practice in a number of different ways, but in each method the glass window or panel and the reading lens associated therewith are disposed to the front of and at some distance in advance of the chart or other index from which it is desired to obtain the necessary reading.

The invention will now be described with particular reference to the accompanying sheet of drawings which illustrate two methods of carrying the invention into effect.

In the drawings:—

Figure 1 is a front elevation illustrating one form of reading device in accordance with the invention applied to the front lens of a cylinder weighing scale of known construction, sufficient only of the scale being shown as is necessary to an understanding of the invention.

Figure 2 is a transverse vertical section taken on the plane indicated by the line 2—2 Figure 1.

Figure 3 is a view similar to Figure 1 but illustrating the rear lens reading device.

Figure 4 is a transverse section taken on the plane indicated by the line 4—4 Figure 3.

Figure 5 is a front elevation of a modified construction of lens reading device, and Figure 6 is a transverse vertical section taken on the plane indicated by the line 6—6 Figure 5.

The chart or graduated scale, (not illustrated), as is common practice, is preferably associated with a fixed hairline or reading wire disposed adjacent the chart or graduated scale, and the chart or graduated scale is rotated or oscillated under the control of the resistant of the apparatus. The lens 7 of the reading apparatus is of a rectangular shape and is secured to the front of a glass panel 8 mounted within a frame 9 forming part of the indicator housing of the scale in known manner. Adjacent the upper and lower bounding edges or lines of the lens 7 or around the lens as seen in Figure 3 the glass panel 8 is provided with stippled sections or bands $8^a$ which serve to prevent the reading of the chart or graduated scale other than through the lens thereby ensuring that the salesman or other reader of the indications must make his observation within the limits determined by the distance between the two parallel longitudinal bounding edges of the lens and thus minimizing the error due to parallax.

In order to further reduce this error the lens 7 is formed of such a width that only one complete observation say of a numerical character can be obtained at the one time.

The transparent and translucent sections of glass panels or areas 8 above and below the rectangular lens constitute a means for admitting light to the chart or indicator.

In the modification illustrated in Figures 5 and 6 a lens 7 of relatively greater depth is employed than the lens utilized in the constructions illustrated in Figures 1 to 4 and at the upper and lower portion thereof the lens is provided with stippled bands $7^a$ so as to delimit the area of the lens through which a reading can be obtained to the central portion thereof so as to minimize error due to parallax.

The particular method of construction or arrangement of the lens in or relative to the glass panel does not constitute the essential feature of this invention as the lens may be mounted within or on or adjacent to either face of the panel and may be provided with a definite obstructive framework, or the edge of the lens itself, where it adjoins or abuts the glass panel, may constitute the frame beyond which limit a reading cannot take place.

What I claim is:—

In combination with a weighing scale an anti-parallax reading device comprising a lens, a transparent reading portion of said lens slightly larger in area than the space containing the material to be read and optically obstructing bands around the edges of the said lens and bounding the space containing the aforesaid transparent reading portion so as to ensure that a reading can only be made through the transparent reading portion thus minimizing errors due to parallax.

In testimony whereof I have signed my name to this specification.

WILLIAM TIMSON.